US006486769B1

(12) United States Patent
McLean

(10) Patent No.: US 6,486,769 B1
(45) Date of Patent: Nov. 26, 2002

(54) METHOD AND SYSTEM FOR AUTOMATIC ADJUSTMENT AND DIAGNOSIS OF RADIO FREQUENCY IDENTIFICATION SYSTEMS USING PROGRAMMABLE CHECKTAGS

(75) Inventor: Charles Milton McLean, Richardson, TX (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/470,159

(22) Filed: Dec. 22, 1999

(51) Int. Cl.[7] .................................................. H04Q 1/00
(52) U.S. Cl. ................. 340/10.32; 340/10.1; 340/572.4
(58) Field of Search ............................. 340/10.1, 10.32, 340/10.6, 7.46, 568.1, 572.1, 572.4; 342/42, 125, 450, 457

(56) References Cited

U.S. PATENT DOCUMENTS

| 4,079,414 A | * | 3/1978 | Sullivan .................. 340/10.32 |
| 5,216,233 A | | 6/1993 | Main et al. |
| 5,410,315 A | | 4/1995 | Huber |
| 5,434,572 A | | 7/1995 | Smith |
| 5,673,037 A | | 9/1997 | Cesar et al. |
| 5,763,867 A | | 6/1998 | Main et al. |
| 5,777,561 A | * | 7/1998 | Trieu et al. ............... 340/10.32 |
| 5,939,984 A | | 8/1999 | Brady et al. |
| 5,942,987 A | | 8/1999 | Heinrich et al. |
| 5,959,568 A | * | 9/1999 | Woodley ...................... 342/42 |
| 5,962,837 A | | 10/1999 | Main et al. |
| 6,219,559 B1 | * | 4/2001 | Hill et al. .................... 455/522 |

OTHER PUBLICATIONS

"Radio Frequency Identification RFID—A Glossary" AIM International WP–98/001R; pp. 1–22; Jul. 7, 1999.
"Radio Frequency Identification RFID—A Basic Primer" AIM International WP–98/002R; pp. 1–15; Jul. 7, 1999.
"Radio Frequency Identification—Presentations and Papers—Applications of Radio Frequency Identification (RFID)" By: Anthony Sabetti; pp. 1–5; Jul. 7, 1999.

* cited by examiner

Primary Examiner—Van Trieu
(74) Attorney, Agent, or Firm—O'Melveny & Myers LLP

(57) ABSTRACT

A method and system is provided for automatically adjusting a radio frequency communication system to define the spatial dimensions of a read zone and no-read zone using programmable checktags. The system comprises a controller adapted to send and receive data from two subsets of a plurality of transponders. The first subset of transponders is located in a spatial read zone, and the second subset of transponders is located in a spatial no-read zone. The system automatically adjusts transmission parameters to ensure that only the first subset of transponders is able to be read.

23 Claims, 3 Drawing Sheets

METHOD AND SYSTEM FOR AUTOMATIC ADJUSTMENT AND DIAGNOSIS OF RADIO FREQUENCY IDENTIFICATION SYSTEMS USING PROGRAMMABLE CHECKTAGS

BACKGROUND OF THE INVENTION

1. Field of the Invention

The present invention relates generally to radio frequency identification (RFID) systems, and more particularly, to a method and system for automatic adjustment and diagnosis of RFID systems using programmable checktags.

2. Description of Related Art

In the automatic data identification industry, the use of radio frequency (RF) transponders (also known as RF tags) has grown in prominence as a way to track data regarding an object on which an RF transponder is affixed. An RF transponder generally includes a semiconductor memory in which information may be stored. An RF interrogator containing a transmitter-receiver unit is used to query an RF transponder that may be at a distance from the interrogator. The RF transponder detects the interrogating signal and transmits a response signal containing encoded data back to the interrogator. RFID systems are used in applications such as inventory management, security access, personnel identification, factory automation, automotive toll debiting, and vehicle identification, to name just a few.

Such RFID systems provide certain advantages over conventional optical indicia recognition systems (e.g., bar code symbols). For example, the RF transponders may have a memory capacity of several kilobytes or more, which is substantially greater than the maximum amount of data that may be contained in a bar code symbol. The RF transponder memory may be re-written with new or additional data, which would not be possible with a printed bar code symbol. Moreover, RF transponders may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several RF transponders may be read by the interrogator at one time.

RF tags may either be "active," containing their own RF transmitter, or "passive," having no transmitter. Passive tags, i.e., tags that rely upon modulated back-scattering to provide a return link to an interrogating base station, may include their own power sources, such as batteries, or they may be "field-powered," whereby they obtain their operating power by rectifying an interrogating RF signal. Although both battery-powered and field powered tags have minimum RF field strength read requirements, or read thresholds, in general, a field-powered passive system requires at least an order of magnitude more power in the interrogating signal than a system that employs tags having their own power sources. Because the interrogating signal must provide power to a field-powered passive tag, the read threshold for a field-powered passive tag is typically substantially higher than for an active tag. However, because field-powered tags do not include their own power source, they may be substantially less expensive than active tags; and because they have no battery to "run down," field-powered passive tags may be more reliable in the long term than active tags. And, because they do not include a battery, field-powered passive tags are typically much more "environmentally-friendly."

One of the primary disadvantages of prior art RFID systems is that their initial installation and ongoing maintenance has been a highly manual operation. For example, a typical installation of a RFID system requires a field engineer to travel to the installation location and identify the read zone for the particular installation. Once the read zone has been identified, a checktag is placed in the read zone and the interrogator is manually adjusted (e.g., using a screwdriver) to provide the desired RF power and noise injection settings. In many applications, the checktag is physically wired to the interrogator. Once the initial installation of the RFID system is complete, ongoing maintenance may be required as various operational and environmental conditions affect the performance of the system. This ongoing maintenance has similarly been a highly manual operation, requiring the field engineer to return to the system location and make the necessary required adjustments. In some applications, the checktags have included some capability for remote diagnostics; however, the capability has been limited to a simple go/no-go analysis without the ability to remotely adjust the operating parameters of the interrogator. As a result, it has not yet been possible to automate the ongoing maintenance of these RFID systems.

Accordingly, it would be very desirable to provide a method and system for automatically and remotely adjusting and diagnosing RFID systems using programmable checktags.

SUMMARY OF THE INVENTION

The present invention provides a method and system for automatically and remotely adjusting and diagnosing RFID systems using programmable checktags. More particularly, the present method and system automatically adjusts RFID transmission parameters in order to read RFID tags within a spatially defined read zone while excluding RFID tags in a no-read zone.

In an embodiment of an automatic RFID adjustment system of the present invention comprises a controller adapted to send and receive data from a plurality of transponders, organized into a first and second subset of transponders. The controller may further comprise computer software adapted to run a power adjustment program, a radio including a transmitter and receiver, and a digital signal processor adapted to adjust the transmission parameters of the system. The first subset of the plurality of transponders is located in a spatially defined read zone, and the second subset of transponders is located in a spatially defined no-read zone. When the automatic adjustment program is selected, the RFID adjustment system automatically queries the first and second subsets of transponders, and adjusts transmission parameters to read all transponders in the read zone but to exclude the transponders in the no-read zone.

The present invention further comprises a method of automatically adjusting the radio frequency transmission parameters between the controller and the selected plurality of transponders. Initially, the controller transmits a signal to the first subset of transponders located within the read zone, and analyzes any responsive signals from the first subset of transponders. The controller adjusts transmission parameters to ensure that all transponders within the read zone receive signals from and return signals to the controller. The controller next transmits a signal to the second subset of transponder located in the no-read zone, and analyzes any responsive signals from the second subset of transponders. The controller then adjusts transmission parameters to ensure that all transponders located in the no-read zone do not respond to query transmissions by the controller. These steps are re-performed in a loop type operation until all transponders in the read zone are queried, and all transponders in the no-read zone are not queried.

BRIEF DESCRIPTION OF THE DRAWINGS

The invention will be more completely understood and appreciated by careful study of the following more detailed description of a presently preferred exemplary embodiment of the invention taken in conjunction with the accompanying drawings, of which.

DETAILED DESCRIPTION OF THE PREFERRED EMBODIMENT

The present invention satisfies the need for a method and system for automatically and remotely adjusting and diagnosing RFID systems using programmable checktags. In the detailed description that follows, like element numerals are used to describe like elements illustrated in one or more of the figures.

Figure 1:
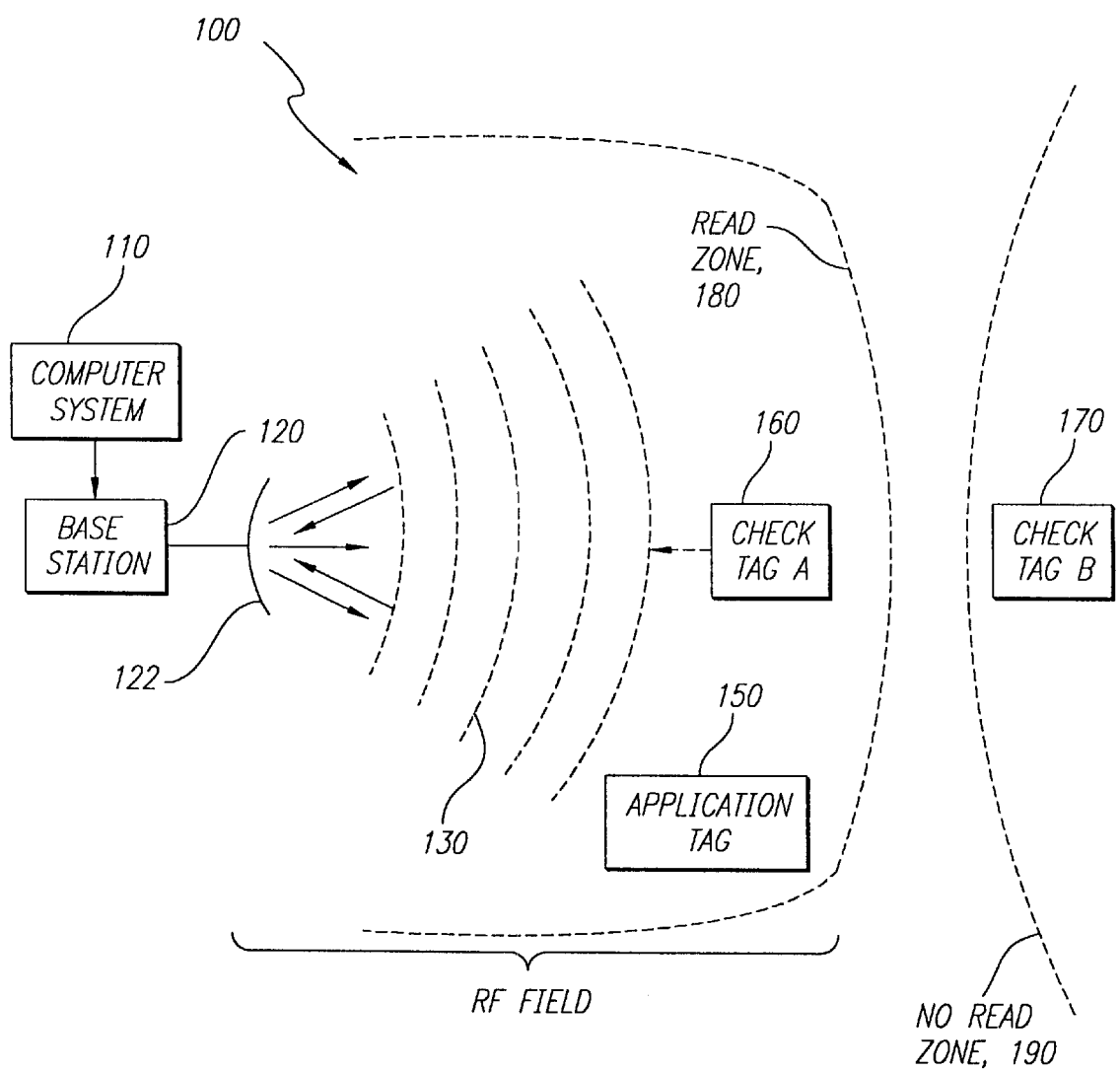
FIG. 1 is a diagram of an automatic RFID adjustment system.

FIG. 1. illustrates an exemplary RFID adjustment system 100. The RFID adjustment system 100 comprises a computer system 110, a base station 120 and a plurality of transponders, of which two are shown in FIG. 1, i.e., checktag A 160 and checktag B 170. The computer system 110 may comprise a server computer that acts as a conduit for communication of data packets with systems outside the RFID system 100, or a personal computer having a processor and non-volatile data storage device, such as a hard disk drive, optical disk drive, and the like. A user can enter commands and information into the computer system 110 through input devices such as a keyboard, mouse, microphone, joystick, game pad, scanner, etc. A monitor or other display device coupled to the computer system 110 provides visual output to the user. Other output devices coupled to the computer system 110 may include printers, speakers, etc.

The RFID adjustment system 100 further includes a base station 120 coupled to the computer 110. The base station 120 is adapted to read encoded data stored in RFID checktags 160; 170. The base station 120 may have a hard-wired link to the computer system 110, or alternatively, may communicate over an RF or optical data link. The base station 120 further includes an antenna 122 that permits RF communication with the RFID checktags 160, 170. The base station 120 transmits RF signals 130 through the antenna 122 to the RF checktags 160, 170.

Checktag A 160 and checktag B 170 comprise transponder devices for receiving and transmitting return signals to a signal source, e.g., the base station 120. The checktags A and B 160, 170 also may either be "active," in which they contain their own transmitter, or "passive," in which they have no transmitter, but rely upon modulated back-scattering to provide a return link to the interrogating base station 120. An exemplary application tag 150 is shown. The exemplary application tag 150 comprises a transponder device for receiving and transmitting a signal to the base station 120 during normal operation of the RFID adjustment system 100 when the RFID adjustment system 100 is not being used to adjust read parameters, but instead being used to query application tags 150.

A read zone 180 comprises a predetermined spatial region in which the exemplary application tag 150 should always be read by the base station 120, and outside of which the exemplary application tag 150 should not be read. A no-read zone 190 comprises a spatial region representing the nearest limit of locations of tags that should never be read by the base station 120. The checktags A and B 160, 170 are located so as to define the parameters of the read zone 180. Checktag A 160 is located at a point representing the farthest limit of locations of tags that should always be read, i.e., the limit of the read zone 180. Checktag B 170 is located at a point representing the nearest limit of locations of tags that should never be read, i.e., the no-read zone 190. Checktags A and B 160, 170 may be permanently mounted to fixed structures. Checktags A and B 160, 170 and the exemplary application tag 150 may have a unique programmed ID number such that a command or query may be sent to only one or both of the checktags A and B 160, 170 and not to the exemplary application tag 150.

The RFID adjustment system 100 operates by sending a query signal from the base station 120 to the checktags A and B 160, 170. In many applications, it is critical to control the size of the query zone as defined by the read zone 180.

Because of the placement of checktag A 160 and checktag B 170 in the read zone 180 and the no-read zone 190, respectively, it is desirable to obtain a response from checktag A 160, but not from checktag B 170. If the base station 120 does not receive a response from checktag A 160, the base station 120 adjusts the strength of the RF signal 130 to thereby increase the range of the signal sent by the base station 120. The base station 120 continues to adjust the strength of the RF signal 130 until it receives a response from checktag A 160. If the base station 120 receives a reply from checktag B 170, the base station 120 lowers the strength of the RF signal 130, thereby decreasing the range of the RF signal 130. The base station 120 continues to lower the strength of the RF signal 130 until no return signal is received from checktag B 170. In such a manner, the RFID adjustment system 100 automatically adjusts the parameters of its broadcast range such that tags in the read zone 180 are queried, but tags located in the no-read zone 190 are not queried. RF signal strength may be adjusted by manipulating frequency, gain, amplitude, etc. as is well known in the art. Similarly, receiver sensitivity may also be adjusted to further define the parameters of signals received from transponders.

It should further be apparent to one skilled in the art of RF identification that a greater number of checktags could be placed at specified locations to determine more precisely the parameters of the read zone 180 and the no-read zone 190 and also to account for statistical operability deviations with respect to RFID tags. For illustrative purposes, however, only two checktags A and B, 160, 170 have been shown.

Figure 2:
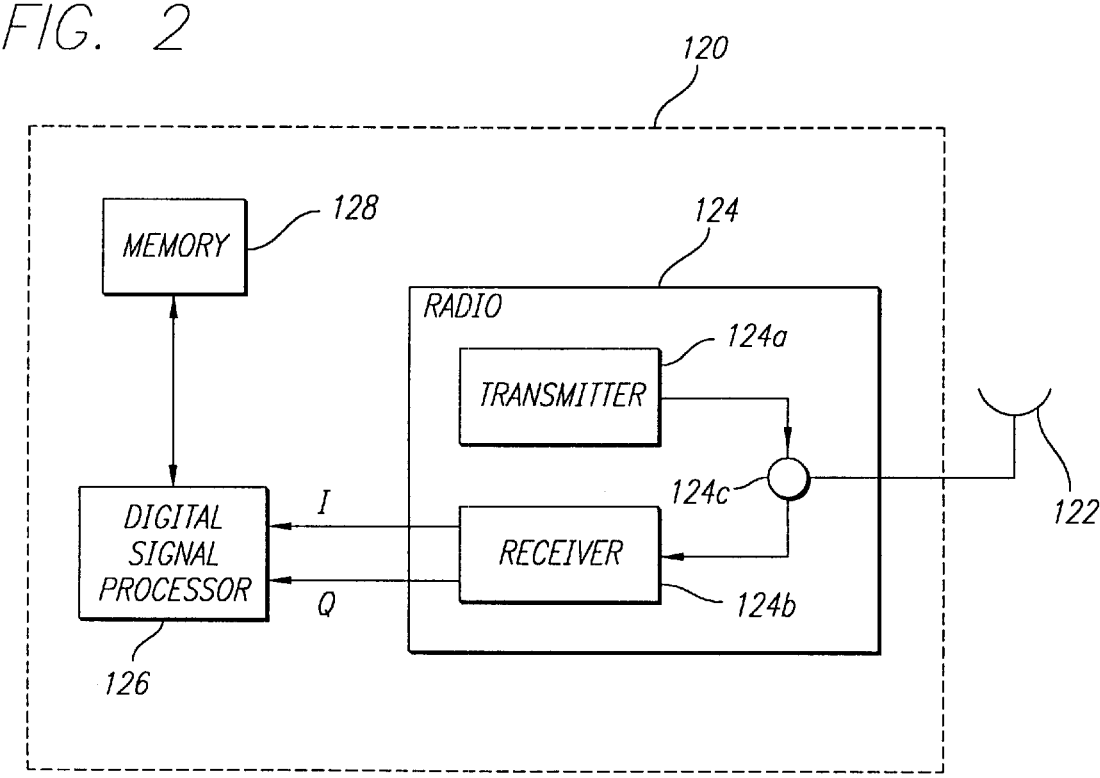
FIG. 2 is a block diagram of RFID base station of FIG. 1.

Referring now to FIG. 2, the base station 120 is illustrated in greater detail. The base station 120 comprises a processor 126, a memory 128 and a radio module 124. The processor 126 processes data signals received from the RFID checktags A and B 160, 170 and communicates with the computer system 110. The term "processor" as generally used herein refers to any logic processing unit, such as one or more central processing units (CPUs), digital signal processors (DSPs), application specific integrated circuits (ASICs), field programmable gate arrays (FPGAs), and the like. The memory 128 includes a random access memory (RAM) and a read-only memory (ROM) to provide storage for program instructions, parameters and data for the processor 126. More particularly, the memory 128 contains stored instructions that are executed by the processor 126 to cause the processor to receive, write, and/or manipulate data recovered from the RFID checktags A and B 160, 170. The memory 128 may further comprise a flash memory or electronically erasable programmable read-only memory (EEPROM). The computer system 110 may communicate new, revised or additional instruction sets to the processor 126 for storage within the memory 128 in order to modify operation of the base station 120.

The radio module 124 provides for RF communications to/from the RFID checktags 160, 170 under the control of the processor 126. The radio module 124 further comprises a transmitter portion 124a, a receiver portion 124b, and a hybrid 124c. The antenna 122 is coupled to the hybrid 124c. The hybrid 124c may further comprise a circulator, directional coupler, or like component that permits bi-directional communication of signals with sufficient signal isolation. The transmitter portion 124a includes a local oscillator that generates an RF carrier frequency. The transmitter portion 124a sends a transmission signal modulated by the RF carrier frequency to the hybrid 124c, which in turn passes the signal to the antenna 122. The antenna 122 broadcasts the modulated signal and captures signals radiated by RFID tags, such as the RFID checktags 160, 170. The antenna 122 then passes the captured signals back to the hybrid 124c, which forwards the signals to the receiver portion 124b. The receiver portion 124b mixes the captured signals with the RF carrier frequency generated by the local oscillator to directly downconvert the captured signals to a baseband information signal. The baseband information signal may comprises two components in quadrature, referred to as the I (in phase with the transmitted carrier) and the Q (quadrature, 90 degrees out of phase with the carrier) signals. The hybrid 124c connects the transmitter 124a and receiver 124b portions to the antenna 122 while isolating them from each other. In particular, the hybrid 124c allows the antenna 122 to send out a strong signal from the transmitter portion 124a while simultaneously receiving a weak backscattered signal reflected from the RFID checktags 160, 170.

Figure 3:
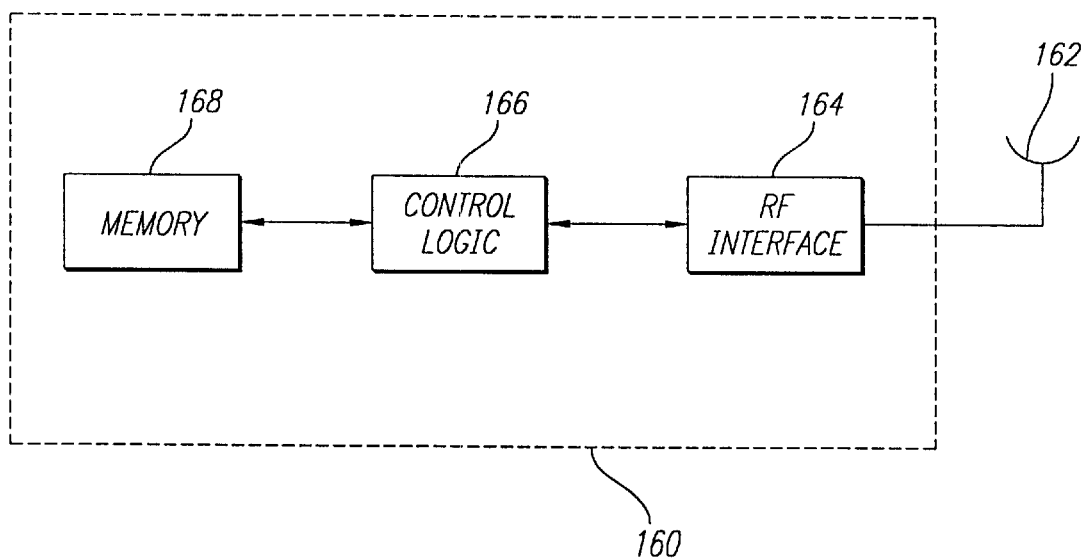
FIG. 3 is a block diagram an RFID checktag of FIG. 1.

Referring now to FIG. 3, the RFID checktag A 160 is illustrated in greater detail. The RFID checktag 160 A is similar in construction to the RFID application tag 150, and the RFID checktag B 170 described above with respect to FIG. 1. More particularly, the RFID checktag A 160 includes an RF interface 164, control logic 166 and memory 168. The RF interface 164 is coupled to an antenna 162, and may include an RF receiver that recovers analog signals that are transmitted by the base station 120 and an RF transmitter that sends data signals back to the RFID reader. The RF transmitter may further comprise a modulator adapted to backscatter modulate the impedance match with the antenna 162 in order to transmit data signals by reflecting a continuous wave (CW) signal provided by the base station 120. The control logic 166 controls the functions of the RFID checktag A 160 in response to commands provided by the Base station 120 that are embedded in the recovered RF signals. The control logic 166 accesses the memory 168 to read and/or write data therefrom. The control logic 166 also converts analog data signals recovered by the RF interface 164 into digital signals comprising the received commands, and converts digital data retrieved from the memory 168 into analog signals that are backscatter modulated by the RF interface 164. The RFID checktag 160 may be adapted to derive electrical power from the interrogating signal provided by the base station 120, or may include an internal power source (e.g., battery). The memory 168 of the RFID checktag 160 A contains a space for data storage having plural fields that may be defined by an end user of the automated data collection system.

Figure 4:
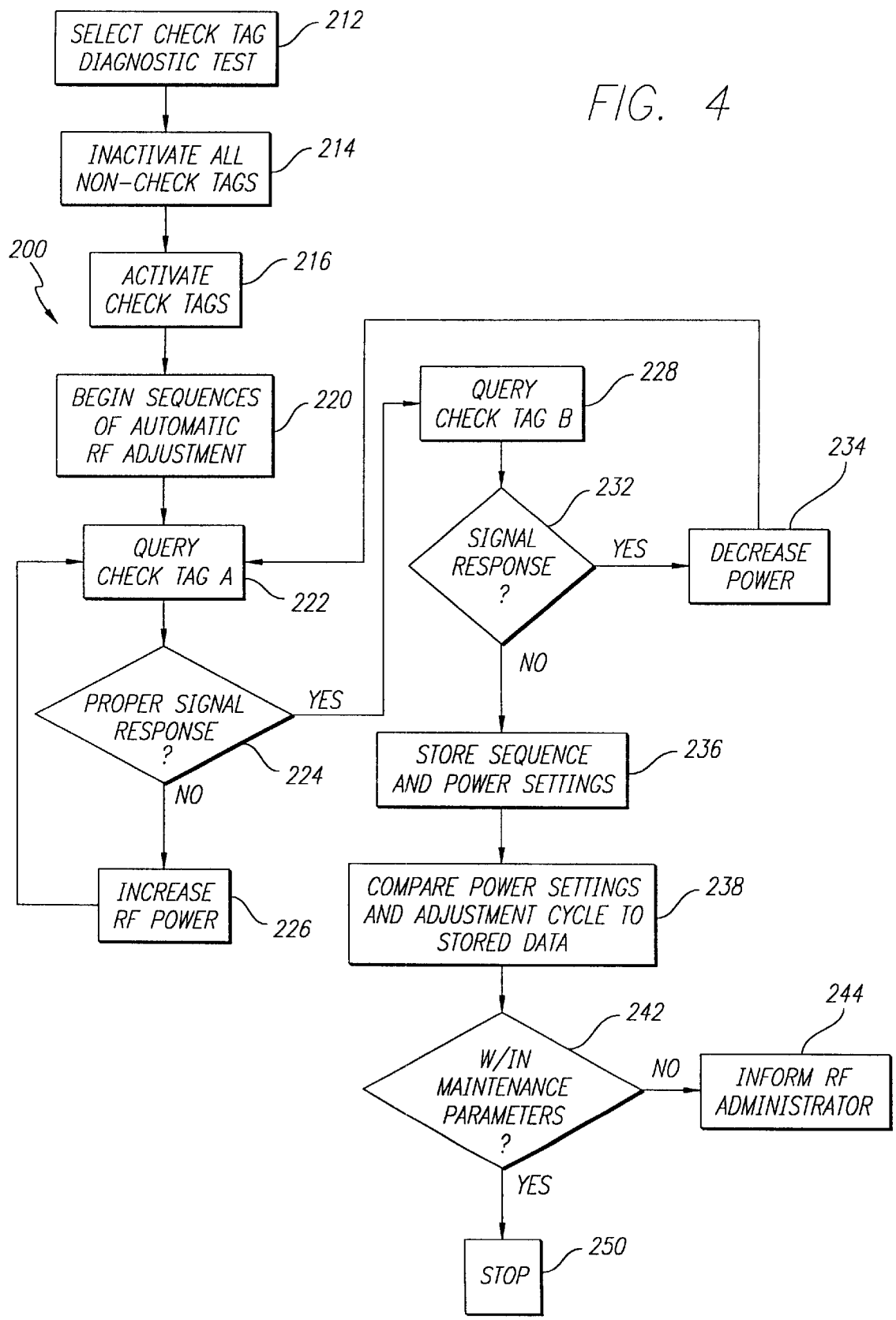
FIG. 4 is a logic sequence of a control program showing the steps taken to automatically and remotely adjust radio frequency parameters.

FIG. 4 depicts a software logic diagram 200 for the computer system 110 (shown in FIG. 1) running the automatic adjustment steps described below. The sequence of steps is started by selecting the checktag diagnostic test at step 212. This selection may be made manually or at a predetermined time conforming with an automatic maintenance schedule. Selecting the checktag diagnostic test commands the RFID system 100 to cease its normal mode of operations and begin checking its RF parameters. Pursuant to selecting the diagnostic test, the base station 120 sends a signal to inactivate all non-checktags at step 214, e.g., the application tag 150 (shown in FIG. 1). The command is then given to activate all checktags at step 216. In this manner, all of the checktags are activated and the application tags are silenced.

The computer system 110 then begins the sequence of programmable automatic RF power adjustment at step 220. While the term "power adjustment" is used, it should be apparent to one skilled in the art that adjusting other signal variables such as frequency, gain, amplitude, and receiver sensitivity could similarly be used to vary the read range of the base station 120. First, checktag A 160 is queried at step 222. This querying step is as described in the discussion above concerning the broadcast and reception of messages by the base station 120 from checktag A 160. In order for checktag A 160 to respond to the base station 120, checktag A 160 must receive a signal from the base station 120 strong enough to be read. If checktag A 160 receives a strong enough signal, it responds to the base station 120. The base station 120 determines whether the proper signal response was obtained at step 224. If the proper signal response was not obtained, the RF power of the base station 120 is increased at step 226, and the query of checktag A 160 in step 222 is repeated. If the proper response is obtained, the base station 120 next queries checktag B 170 at step 228. In the same manner as discussed above, checktag B 170 will only respond if it receives a signal of a requisite strength. A determination is made by the base station 120 of whether signal response was obtained at step 232. If a response was obtained from checktag B 170, RF power is decreased at step 234, and the query of checktag A 160 is repeated at step 222. If no signal response is obtained from checktag B 170, the computer system 110 then stores the program sequence and power settings at step 236. In this manner, the power of the RF signal sent by the base station is adjusted to include the area bounded by the read zone 180 and to exclude the area bounded by the no read zone 190.

Next, the processor 126 compares the power setting and program sequence with results stored in its memory at step 238. A comparison is made to determine whether the power setting and program sequence are within pre-programmed maintenance parameters at step 242. If the power setting and program sequence are not within pre-programmed maintenance parameters, the computer system 110 sends a message to inform the RF administrator of the problem at step 244. If the settings are within pre-programmed maintenance parameters, the sequence is stopped at step 250.

Note that while this disclosure specifically addresses RFID tags using radio frequencies to communicate with the controller, the invention also applies generally to any communication system where a base unit communicates with one or more transponders, e.g., tags. The communication device is not limited to radio frequency but includes any media for communicating information, i.e., laser, infrared, visible light (photo optics), ultraviolet, magnetics, and/or other electromagnetic media. All of these systems are generally similar in that they involve the transmission and receipt of an energy signal.

Having thus described a preferred and alternative embodiment of the emissions measuring system, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for communicating between a controller and a plurality of transponders, said method comprising:
    disposing a first subset of said plurality of transponders in a desired read zone of said controller;
    disposing a second subset of said plurality of transponders in a desired no-read zone of said controller;
    transmitting a first signal from said controller to said first subset of said plurality of transponders;
    attempting to receive a first responsive signal from said first subset of said plurality of transponders by said controller in response to said first signal;
    transmitting a second signal from said controller to said second subset of said plurality of transponders;
    attempting to receive a second responsive signal from said second subset of said plurality of transponders by said controller in response to said second signal; and
    adjusting transmitting parameters of said controller to permit communications with said first subset of said plurality of transponders and to preclude communications with said second subset of said plurality of transponders.

2. The method of claim 1, further comprising activating said first and second subsets of said plurality of transponders prior to said transmitting steps.

3. The method of claim 1, further comprising determining whether said first responsive signal from said first subset of said plurality of transponders is received, and wherein said adjusting step further comprises adjusting said transmitting parameters to increase a read range of said controller if said first responsive signal is not received.

4. The method of claim 1, further comprising determining whether said second responsive signal from said second subset of said plurality of transponders is received, and wherein said adjusting step further comprises adjusting said transmitting parameters to decrease a read range of said controller if said second responsive signal is received.

5. The method of claim 1, further comprising storing said adjusted transmitting parameters.

6. The method of claim 5, further comprising comparing said stored adjusted transmitting parameters with predetermined transmitting parameters.

7. The method of claim 6, further comprising determining whether said stored adjusted transmitting parameters are within a desired range.

8. The method of claim 1, wherein said transponders further comprise RF transponders, and said transmitting steps further comprise transmitting first and second RF signals, respectively.

9. The method of claim 1, wherein said adjusted transmitting parameters of said controller permit communications of said controller with an application transponder within said desired read zone of said controller and not with an application transponder within said desired no-read zone.

10. A system for automatically adjusting communication parameters comprising:
    a controller adapted to send and receive data from a plurality of transponders, said controller further comprising a processor having stored instructions that are executed to adjust communication parameters, and a radio coupled to said processor and having a receiver and a transmitter, said communication parameters determining operation of said radio, and
    a plurality of transponders spaced from said controller and being adapted to receive signals from and transmit signals to said controller, said plurality of transponders further comprising a first subset of said plurality of transponders disposed within a spatial read zone and a second subset of said plurality of transponders disposed outside said spatial read zone;
    wherein said communication parameters are adjusted by operation of said processor in conjunction with said stored instructions to permit communication with said first subset of said plurality of transponders and preclude communication with said second subset of said plurality of transponders.

11. The system of claim 10, wherein said controller further comprises a memory coupled to said processor and containing said stored instructions.

12. The system of claim 10, wherein said communication parameters further comprise a gain of signals transmitted by said controller to said plurality of transponders.

13. The system of claim 10, wherein said stored instructions further comprise:
    transmitting a first signal to said first subset of said plurality of transponders;
    attempting to receive a first responsive signal from said first subset of said plurality of transponders in response to said first signal;
    transmitting a second signal to a second subset of said plurality of transponders;
    attempting to receive a second responsive signal from said second subset of said plurality of transponders in response to said second signal; and
    adjusting said communication parameters to permit communications with said first subset of said plurality of transponders and to preclude communications with said second subset of said plurality of transponders.

14. The system of claim 13, wherein said stored instructions further comprise activating said first and second subsets of said plurality of transponders prior to executing said transmitting instructions.

15. The system of claim 13, wherein said stored instructions further comprise determining whether said first responsive signal from said first subset of said plurality of transponders is received, and wherein said adjusting instruction further comprises adjusting said transmitting parameters to increase a read range of said controller if said first responsive signal is not received.

16. The system of claim 13, wherein said stored instructions further comprise determining whether said second responsive signal from said second subset of said plurality of transponders is received, and wherein said adjusting instruction further comprises adjusting said transmitting parameters to decrease a read range of said controller if said second responsive signal is received.

17. The system of claim 13, wherein said stored instructions further comprise storing said adjusted transmitting parameters.

18. The system of claim 17, wherein said stored instructions further comprise comparing said stored adjusted transmitting parameters with predetermined transmitting parameters.

19. The system of claim 18, wherein said stored instructions further comprise determining whether said stored adjusted transmitting parameters are within a desired range.

20. The system of claim 13, wherein said stored instructions further comprise disposing said first subset of said plurality of transponders in a desired read zone of said controller.

21. The system of claim 13, wherein said stored instructions further comprise disposing said second subset of said plurality of transponders in a desired no-read zone of said controller.

22. The system of claim 13, wherein said plurality of transponders further comprise RF transponders.

23. The system of claim 10, wherein said adjusted communication parameters of said controller permit communication of said controller with an application transponder within a spatial read zone and not with an application transponder outside said spatial read zone.

* * * * *